United States Patent [19]

Bartoszek-Loza et al.

[11] Patent Number: 4,837,057
[45] Date of Patent: Jun. 6, 1989

[54] PROCESS FOR PREPARING HIGH NITRILE COATINGS ON METAL OR PLASTIC MATERIALS

[75] Inventors: Rosemary Bartoszek-Loza, Solon; Richard J. Butler, Euclid, both of Ohio

[73] Assignee: The Standard Oil Company, Cleveland, Ohio

[21] Appl. No.: 137,279

[22] Filed: Dec. 23, 1987

[51] Int. Cl.$^4$ .............................................. B05D 3/02
[52] U.S. Cl. .............................. 427/388.4; 427/393.5; 524/831
[58] Field of Search ......................... 427/388.4, 393.5; 524/831

[56] References Cited

U.S. PATENT DOCUMENTS

| | | | |
|---|---|---|---|
| 4,159,364 | 6/1979 | Craig | 428/334 |
| 4,172,064 | 10/1979 | Keeler | 524/831 X |
| 4,238,535 | 12/1980 | Talsma et al. | 427/388.4 |
| 4,312,914 | 1/1982 | Guth | 524/831 X |
| 4,350,622 | 9/1982 | Hiyoshi et al. | 524/831 |

Primary Examiner—Michael Lusignan
Attorney, Agent, or Firm—Larry W. Evans; Joseph G. Curatolo; Teresan W. Gilbert

[57] ABSTRACT

Substrates such as metal and plastic can be protected from the environment by employing a high nitrile polymer coating.

15 Claims, No Drawings

PROCESS FOR PREPARING HIGH NITRILE COATINGS ON METAL OR PLASTIC MATERIALS

BACKGROUND

The present invention is directed generally to a novel process to coat metals and/or plastics with a high nitrile coating. Further, the invention relates to a thermally cured solvent borne high nitrile polymer coatings that have excellent barrier protection such as corrosion resistance and solvent resistance on substrates such as metal, plastic and the like.

High nitrile latex coatings are known in the art. U.S. Pat. No. 4,238,535 is a representative example of nitrile latex coating compositions and their preparation. The patent discloses a process to produce nitrile latex coatings by thermal cure.

The search for a high nitrile coating on plastics and metals offering optimum barrier properties that is solvent borne and not a latex led to the instant invention. The advantages of a solvent borne coating process allows for the minimization of surface defects. The advantages of a non-latex nitrile composition coating are many including stability of the nitrile polymer, easy handling and transportation of the polymer and the like.

It is an object of this invention to develop a new process to produce high nitrile coatings that are non-latices. It is another object of this invention to develop a thermal cure solvent borne process to produce high nitrile coating that have excellent barrier properties.

These and other objects, together with the advantages over known methods shall become apparent from the specification which follows and are accomplished by the invention as hereinafter described and claimed.

SUMMARY OF THE INVENTION

We have discovered that excellent barrier properties on metal and plastic surfaces can be obtained through the use of the process of the instant invention.

The invention relates to a novel coating process comprising;
(1) Preparing a high nitrile latex,
(2) precipitating the high nitrile polymer from the high nitrile latex,
(3) dissolving the high nitrile polymer in a solvent to form a coating composition,
(4) applying the high nitrile polymer coating composition onto a substrate, and
(5) drying the coating composition at temperatures from about room temperature to about 500° C. to produce a tack free coating.

The high nitrile polymer coatings can be used where excellent barrier protection of substrates is important. Major uses for the coating would be for packaging, encapsulating or coating products where corrosion resistance, solvent resistance, oxygen barrier protection and the like is necessary and/or important.

DETAILED DESCRIPTION OF THE INVENTION

The process of instant invention employs high nitrile coatings that are made from high nitrile polymers precipitated from high nitrile latexes and then mixed with solvent to form a coating composition.

In the practice of this invention any of the high nitrile latexes can be employed either alone or in combination. High nitrile latexes used in this invention comprise, by weight, about 40 percent to about 90 percent nitrile monomer, about 5 percent to about 40 percent monovinyl monomer and about 1 percent to about 30 percent rubber component.

The high nitrile latexes useful in the invention process to produce high nitrile polymers can be prepared by any method known in the art. Preferably, these nitrile latexes are prepared by polymerization in an emulsion of a major portion of an olefinically unsaturated monovinyl nitrile, a second monovinyl monomer component copolymerizable therewith and a performed rubber component. The preparation of typical high nitrile latexes are more fully described in U.S. Pat. Nos. 4,238,535 and 4,379,875 which is herein incorporated.

The preferred high nitrile latexes comprise a copolymer produced by the polymerization of a major portion of a vinyl- mono-unsaturated nitrile and a minor portion of a second monovinyl monomer component.

The olefinically unsaturated nitriles used in the present inventions are the alpha, beta-olefinically unsaturated mononitriles having the structure:

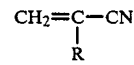

wherein R is a hydrogen, a lower alkyl group having from 1 to 4 carbon atoms or a halogen. Such compounds include acrylonitrile, alpha-chloroacrylonitrile, alpha-fluoroacrylonitrile, methacrylonitrile, ethacrylonitrile and the like. The most preferred olefinically unsaturated nitrile are acrylonitrile, methacrylonitrile and mixtures thereof.

The monovinyl monomer component copolymerizable with the olefinically unsaturated nitrile includes one or more of the esters of olefinically unsaturated carboxylic acids, vinyl esters, vinyl ethers, alpha-olefins, vinyl aromatic monomers and others.

The esters of olefinically unsaturated carboxylic acids include those having the structure:

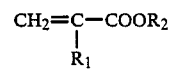

wherein $R_1$ is a hydrogen, an alkyl group having from 1 to 30 carbon atoms, or a halogen, and $R_2$ is an alkyl group having from 1 to 6 carbon atoms. Compounds of this type include but are not limited to methyl acrylate, ethyl acrylate, the propyl acrylates, the butyl acrylates, the amyl acrylates, the hexyl acrylates, methyl methacrylate, ethyl methacrylate, the propyl methacrylates, the butyl methacrylates, the amyl methacrylates and the hexyl methacrylates, methyl alpha-chloroacrylates, ethyl alpha-chloroacrylates, acrylic acid, methacrylic acid and the like. Most preferred in the present invention are methyl acrylate, ethyl acrylate, methyl methacrylate, ethyl methacrylate, acrylic acid, methacrylic acid and mixtures thereof.

The alpha-olefins useful in the present invention are those having at least 4 and as many as 10 carbon atoms having the structure:

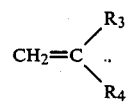

wherein $R_3$ and $R_4$ are alkyl groups having from 1 to 7 carbon atoms. Representative compunds include isobutylene, 2-methyl butene-1, 2-methyl penetene-1, 2-methyl hexene-1, 2-methyl heptene-1, 2-methyl octene-1, 2-ethyl butene-1, 2-propyl pentene-1 and the like. Most preferred is isobutylene.

The vinyl ethers include methyl vinyl ether, ethyl vinyl ether, the propyl vinyl ethers, the butyl vinyl ethers, methyl isopropenyl ether, ethyl isopropenyl ether and the like. Most preferred are methyl vinyl ether, ethyl vinyl ether, the propyl vinyl ethers, the butyl vinyl ethers and mixture thereof.

The vinyl esters include vinyl acetate, vinyl propionate, the vinyl butyrates and the like. Most preferred is vinyl acetate.

The vinyl aromatic monomers include styrene, alphamethyl styrene, the vinyl toluenes, the vinyl xylenes, indene and the like. Most preferred are styrene, indene and mixtures thereof.

The nitrile latex is optionally in the presence of rubber component which may be a homopolymer or copolymer of a conjugated diene monomer.

The conjugated diene monomers useful in the present invention include butadiene-1,3; isoprene; chloroprene; bromoprene; cyanoprene; 2,3-dimethyl butadiene-1,3; 2-ethyl butadiene-1,3; 2,3-diethyl butadiene-1,3 and the like. Most preferred are butadiene-1,3, isoprene and mixtures thereof.

The conjugated diene monomer may be copolymerized with a comonomer selected from the group consisting of vinyl aromatic monomer, an olefinic nitrile monomer having the structure:

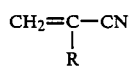

wherein R has the foregoing designation, and an ester having the structure:

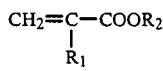

wherein $R_1$ and $R_2$ have the foregoing designations. The rubber component contains from about 50 percent to about 100 percent by weight of polymerized conjugated diene monomer and from about 0 percent to about 50 percent by weight of a comonomer.

Preferred nitrile latexes useful in preparation of the nitrile polymer for the coating compositions of this invention are those prepared by the polymerization of; 100 parts by weight of (A) from about 50 percent to about 90 percent by weight of at least one nitrile having the structure:

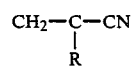

wherein R has the foregoing designation, and (B) from about 10 percent to about 40 percent by weight based on the combined weights of (A) and (B) of at least one member selected from the group consisting of (1) an ester having the structure:

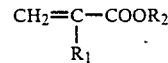

wherein $R_1$ and $R_2$ have the foregoing respective designations, (2) an alpha-olefin having the structure:

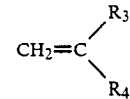

wherein $R_3$ and $R_4$ have the foregoing respective designations, (3) a vinyl ether selected from the group consisting of methyl vinyl ether, ethyl vinyl ether, the propyl vinyl ethers, and the butyl vinyl ethers, (4) vinyl acetate, (5) styrene, and (6) indene, in the presence of from about 1 to about 40 parts by weight of (C) a rubber of a conjugated diene monomer selected from the group consisting of butadiene and isoprene and optionally a comonomer selected from the group consisting of styrene, a nitrile monomer having the structure:

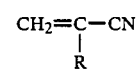

wherein R has the foregoing designation, and an ester having the structure

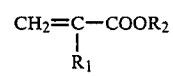

wherein $R_1$ and $R_2$ have the foregoing respective designations, said rubber polymer containing from about 50 percent to about 100 percent by weight of polymerized conjugated diene and from about 0 percent to about 50 percent by weight of a comonomer.

More preferred high nitrile latexes useful in this invention are those prepared by the polymerization of more than about 70 parts by weight of a monounsaturated nitrile and less than about 30 parts by weight of a monovinyl monomer component copolymerizable with said nitrile in the presence of a preformed rubber of a conjugated diene.

The high nitrile latexes useful in the present invention can be prepared in aqueous emulsion by polymerization techniques involving batch, continuous or intermittent addition of monomers and other components. The polymerization is preferably carried out in aqueous medium in the presence of an emulsifier and a free radical generating polymerization initiator at a temperature from about 0° C. to about 100° C. in the substantial absence of molecular oxygen.

The high nitrile polymer is then precipitated from the high nitrile latex. Coagulation of the high nitrile polymer from the high nitrile latex can be effected using conventional methods such as aqueous solution of aluminum potassium sulfate and other methods known in the art. The precipitated high nitrile polymer is then filtered and washed with a medium whereby the precipitated high nitrile polymer will remain insoluble such as water, alcohol or the like. The precipitated high nitrile polymer is then dried by conventional methods such as a vacuum oven and the like.

The coating composition contains a high nitrile polymer mixed with a solvent. The high nitrile polymer can be employed either alone or in combination. The coating composition of the present invention contains high nitrile polymers from at least about 5 percent to about 50 percent of the total weight of the coating composition. More preferably, the coating compositions contains high nitrile polymers from about 15 percent to about 45 percent, and most preferably from about 25 percent to 40 percent of the total weight of the coating composition.

The precipitation of the high nitrile polymer from the high nitrile latex offers many advantages. The high nitrile polymer is then stable over an indefinite period, easier to transport and allows for a broader range of solvents in coating formulations. It is surmised that the stability results because latex latices tend to be unstable and further the addition of additives to ensure latex stability can be detrimental to the performance of the final coating.

The precipitated high nitrile polymer is then mixed with the solvent to form a coating composition. The solvents are employed as a vehicle for the high nitrile polymer in the coating composition. This coating composition of the high nitrile polymer and the solvent is formed at room or elevated temperatures so long as the temperature is controlled so that the coating composition is not deleteriously effected. The solvents employed are any which are compatible with the high nitrile polymer.

The solvents can be employed either alone or in combination. The coating composition generally contains, in percent of the total weight, from about 50 percent to about 95 percent, preferably from about 55 percent to about 85 percent and most preferably from about 60 percent to about 75 percent of the solvent.

Types of suitable solvents include but are not limited to o-, m-, p-phenylene diamine, N-formylhexamethyleneimine, N-nitrosopiperidine, maleic anhydride, chloromaleic anhydride, succinic anhydride, acetic anhydride, citraconic anhydride, gamma-butryolactone, dioxanone, p-dioxanedione, ethylene oxalate, ethylene carbonate, propylene carbonate, 2-oxazolidone, 1-methyl-2-pyridone, 1,5-dimethyl-2-pyrrolidone, Σ-caprolactam, DMF, dimethylthioformamide, N-methyl-$\beta$-cyano-ethylformamide, alphacyanoacetic acid, cyanoacetmide, cyanoacetic acid, N-methylacetamide, N,N-diethylacetamide, DMA, dimethylmethoxyacetamide, N,N-dimethyl,$\alpha,\alpha,\alpha$,-trifluoroacetamide, N,N-dimethylpropionamide, N,N,N'N' tetramethyloxamide, hydroxyacetonitrile, chloroacetonitrile, chloroacetonitrile/water, $\beta$-hydroxypropionitrile, malonitrile, fumaronitrile, succinonitrile, adiponitrile, bis(2-cyanoethyl)ether, Bis(2-cyanoethyl)-sulfide, bis(4-cyanobutyl)sulfone, 1,3,3,5-tetracyanopentane, nitromethane/water(94:6), 1,1,1-trichloro-3-nitro-2-propane, tri(2-cyanoethyl)nitromethane, 3-,4-nitrophenol, methylene dithiocyanate, tri-methylene dithiocynate, DMSO, tetramethylene sulfoxide, dimethyl sulfone, ethyl methyl sulfone, 2-hydroxyethyl methyl sulfone, ethylene-1,2-bis-(ethyl sulfone), dimethyl phosphite, diethylphosphite, sulfuric acid, nitric acid, p-phenol sulfonic acid, lithium chloride, zinc chloride, aluminum perchlorate, sodium thiocyanate, calcium thiocyanate, molten quaternary ammonium salts and their solutions, methylene chloride, pyridine, acetone, cyclohexanone, furfural, cyanoacetic acid, acetanhydride, ethylene carbonate, DMF($>20°$ C.), benzonitrile, dinitriles, nitromethane, DMS, HMTP and the like.

Most preferred solvents are N-vinyl pryrolidone, dimethlyformamide, styrene, N-methyl pyrrolidone, dimethylsulphone and mixtures thereof.

It will be readily apparent to those skilled in the art that the coating compositions of the instant invention may be further modified by the addition of plasticizers, stabilizers, pigments, dispersants, defoamers, surfactants, extenders, fillers, reinforcing agents and other film formers. The coating compositions of the instant invention may also optionally contain various flattening agents, surface active agents, thixotropic agents, UV light absorbers, flow control agents, viscosity agents, antioxidant agents and dyes. All these additives and the use thereof are well known in the art and do not require extensive discussion, it being understood that any compound possessing the ability to function in such a manner, i.e., as a flattening agent, surface active agent and the like, can be used so long as they do not deleteriously affect the curing of the coating composition and do not adversely affect the characteristics of the coating.

A thin, relatively uniform film of high nitrile polymer coating composition is applied onto a substrate by any of the known means such as wet film applicator rods, knife, bar airless spraying, dipping, roller coating, flowing, brushing, conventional and/or electrostatic spray gun, electrodeposition and the like. The various substrates employed can be wood, paper, metal, pretreated metal, plastic, pretreated plastic and the like. Generally, the coating composition is applied in an amount sufficient to provide a dry cured coating with a thickness from about 0.05 mil to about 5 mil, preferably from about 0.1 mil to about 3 mil. Optionally, multiple coats of the composition may be applied to the substrate.

The substrate coated with the coating composition is then dried at a temperature from about room temperature to about 500° C., preferably from about 70° C. to about 210° C. The drying temperature is dependent on the coating composition so long as it does not deleteriously affect the characteristics of the coating. After drying, there is present on the surface of the substrate a cured, hard, non-tacky, adhesive and protective coating.

The high nitrile coatings that are produced by the process of the instant invention offer optimum barrier protection of corrosion resistance and/or solvent resistance. The high nitrile coatings produce excellent barrier protection for metal and plastic substrates.

SPECIFIC EMBODIMENTS

The following examples demonstrate the process and advantages of the present invention.

Test Method

The following coating compositions 1–43 were prepared by precipitating the high nitrile polymer from the high nitrile latex. The high nitrile latices were filtered through cheesecloth. Then the high nitrile latices were coagulated by pouring into twice its volume of methanol or water which contained about 15 millimeters of a saturated aqueous solution of aluminum sulfate per gallon with stirring at about 50° C. The polymers were washed with water and dried in a vacuum oven at about 45° C.

The precipitated high nitrile polymer was then dissolved in a solvent to form a coating composition. The coating for samples 1–44 were then applied by Gardco ® wet film application rods (available from Paul N. Gardener, Lauderdale-By-The-Sea, Fla.) to the surface of the substrate.

Coated panels 1–43 were then dried at about 200° C. The dried coated panel for samples 1–43 were then subjected to salt exposure testing (ASTM B 117).

Salt fog test (ASTM B 117) measures the corrosion resistance of the coating. Salt fog testing was performed by masking with black tape uncoated portions of the sample panel. Then the rest of the sample panel was coated with the coating composition (and thermally cured). A large X was then scribed in coated sample panel. The coated sample panel was placed in a salt-fog cabinet for a given period of time. The cabinet induced accelerated corrosion testing through exposure of the coated sample panels to a salt-fog atmosphere. A rating was given to each coated sample panel based on the degree of rusting and the length of exposure time to the salt-fog atmosphere. Rating are in the range of 0 to 10, with a 0 rating for no appreciable rust, furthermore, the scale is logarthmic between two extreme endpoints.

Evaluation of rusting are as follows:

| Rust Grades | Description |
| --- | --- |
| 10 | less than 0.01% of the surface rusted |
| 9 | less than 0.03% of the surface rusted |
| 8 | less than 0.1% of the surface rusted |
| 7 | less than 0.3% of the surface rusted |
| 6 | less than 1% of the surface rusted |
| 5 | about 3% of the surface rusted |
| 4 | about 10% of the surface rusted |
| 3 | about 1/6 of the surface rusted |
| 2 | about ½ of the surface rusted |
| 1 | about 100% of the surface rusted |

The results of the salt-fog test are shown in Table I.

| Composition ID Number | Composition | Percent Weight |
| --- | --- | --- |
| 1 | Barex 210 ® | 25 |
|   | Gamma-butyrolactone | |
| 2 | Barex 210 ® | 40 |
|   | Gamma-butyrolactone | 60 |
| 3 | Barex 210 ® | 25 |
|   | Dimethylformamide | 75 |
| 4 | Barex 210 ® | 40 |
|   | Dimethylformamide | 60 |
| 5 | Barex 210 ® | 25 |
|   | N—vinylpyrrolidone | 75 |

Barex 210 ® available from the Standard Oil Chemical Company, Cleveland, Ohio.

Substrates

Q-panels-cold rolled steel panels were the substrates for samples 18–34. Q-Panel Co., Cleveland, Ohio; Bonderite 40- zinc phosphate pretreated cold rolled steel panels were the substrates for samples 1–17. Bonderite 1303- controlled complex oxide panels were the substrates for samples 35–43. The Bonderite panels are available from Parker Co., Detroit, Mich.

TABLE I
RUST RATING FOR THERMALLY CURED SOLVENT BORNE HIGH NITRILE COATINGS ON METAL SUBSTRATES

| Example | Composition | Drying Time (min) | Salt-fog Exposure (hrs) | ASTM Rust Rating |
| --- | --- | --- | --- | --- |
| 1 | 1 | 20 | 984 | 7 |
| 2 | 1 | 30 | 984 | 7 |
| 3 | 1 | 40 | 984 | 4 |
| 4 | 2 | 20 | 984 | 7 |
| 5 | 2 | 30 | 984 | 3 |
| 6 | 2 | 40 | 984 | 9 |
| 7 | 3 | 20 | 984 | 5 |
| 8 | 3 | 25 | 984 | 4 |
| 9 | 3 | 30 | 984 | 7 |
| 10 | 3 | 40 | 984 | 7 |
| 11 | 4 | 20 | 984 | 9 |
| 12 | 4 | 25 | 984 | 7 |
| 13 | 4 | 30 | 984 | 5 |
| 14 | 4 | 40 | 984 | 3 |
| 15 | 5 | 20 | 312 | 10 |
| 16 | 5 | 30 | 312 | 10 |
| 17 | 5 | 40 | 312 | 10 |
| 18 | 1 | 20 | 192 | 2 |
| 19 | 1 | 25 | 192 | 7 |
| 20 | 1 | 30 | 192 | 2 |
| 21 | 1 | 40 | 192 | 2 |
| 22 | 2 | 20 | 444 | 6 |
| 23 | 2 | 25 | 444 | 4 |
| 24 | 2 | 40 | 444 | 8 |
| 25 | 3 | 20 | 480 | 3 |
| 26 | 3 | 30 | 480 | 4 |
| 27 | 3 | 40 | 480 | 5 |
| 28 | 4 | 20 | 480 | 3 |
| 29 | 4 | 25 | 480 | 9 |
| 30 | 4 | 30 | 480 | 3 |
| 31 | 4 | 40 | 480 | 3 |
| 32 | 5 | 20 | 168 | 10 |
| 33 | 5 | 30 | 168 | 10 |
| 34 | 5 | 40 | 168 | 10 |
| 35 | 1 | 25 | 432 | 10 |
| 36 | 1 | 30 | 672 | 10 |
| 37 | 2 | 25 | 672 | 10 |
| 38 | 2 | 30 | 672 | 10 |
| 39 | 3 | 25 | 672 | 10 |
| 40 | 3 | 30 | 672 | 10 |
| 41 | 4 | 25 | 672 | 10 |
| 42 | 4 | 30 | 672 | 10 |
| 43 | 5 | 25 | 192 | 0 |

Although the invention has been described in detail through the preceding examples, these are for the purpose of illustration only, and is understood that variations and modifications can be made by one skill in the art without departing from the spirit and the scope of the invention.

We claim:

1. A process for producing a protective barrier coating comprising:
   a. preparing a high nitrile latex composition comprising about 40% to about 90% nitrile monomer, about 5% to about 40% monovinyl monomer and about 1% to about 30% rubber component by weight,
   b. precipitating the high nitrile polymer from the high nitrile latex,
   c. dissolving the high nitrile polymer in a solvent selected from the group consisting of N-vinyl pyrolidone, dimethyloforamide, styrene, N-methyl pyrrolidone, ethylene carbonate, gamma-butyrolactone, dimethylsulphone and combinations thereof to form a coating composition wherein the coating composition comprises a high nitrile polymer from about 5% to about 50% of the total coating composition and a solvent from about 50% to about 95% of the total coating composition, d. applying the high nitrile polymer coating composition onto a substrate selected from the group consisting of metal, pretreated metal, plastic and pretreated plastic, and e. drying the high nitrile polymer coating composition at temperatures from about room temperature to about 500° C. to produce a tack free coating.

2. The process of claim 1 wherein the coating composition comprises high nitrile polymers from at least about 15% to about 45% of the total coating composition.

3. The process of claim 1 wherein the coating composition comprises a high nitrile polymer from about 25% to about 40% of the total weight of the coating composition.

4. The process of claim 1 wherein the drying occurs at room temperature.

5. The process of claim 1 wherein the solvent is selected from the group consisting of N-vinyl pyrrolidone, N-methyl pyrrolidone, dimethylformide, styrene and combinations thereof.

6. The process of claim 1 wherein the solvent is from from about 55% to about 85% of the total weight of the coating composition.

7. A process for producing a protective barrier coating composition consisting essentially of:
(a) preparing a high nitrile latex composition consisting essentially of about 40% to about 90% nitrile monomer, about 40% monovinyl monomer and about 1% to about 1% to about 30% rubber component by weight,
(b) precipitating the high nitrile polymer from the high nitrile latex,
(c) dissolving the high nitrile polymer in the solvent to form a coating composition wherein the coating composition comprises a high nitrile polymer from about 5% to about 50% of the total coating composition and a solvent from about 50% to about 95% of the total coating composition,
(d) applying the high nitrile polymer coating composition onto a substrate, and
(e) drying the high nitrile polymer coating composition at temperatures from about room temperature to about 500° C. to produce a tack free coating.

8. The process of claim 7 wherein the drying occurs at room temperature.

9. The process of claim 1 wherein the solvent is from about 60% to about 75% of the total weight of the coating composition.

10. The process of claim 7 wherein the solvent is from about 55% to about 85% of the total weight of the coating composition.

11. The process of claim 7 wherein the solvent is from about 60% to about 75% of the total weight of the coating composition.

12. The process of claim 1 wherein the high nitrile polymer is from about 15% to about 45% the total weight of the coating composition.

13. The process of claim 1 wherein the high nitrile polymer is from about 25% to about 40% the total weight of the coating composition.

14. The process of claim 7 wherein the high nitrile polymer is from about 15% to about 45% the total weight of the coating composition.

15. The process of claim 7 wherein the high nitrile polymer is from about 25% to about 40% the total weight of the coating composition.

* * * * *